United States Patent [19]

Kohno

[11] Patent Number: 5,287,140
[45] Date of Patent: Feb. 15, 1994

[54] CONTROL UNIT FOR A PROGRAM SHUTTER

[75] Inventor: Takanori Kohno, Tokyo, Japan

[73] Assignee: Copal Company Limited, Tokyo, Japan

[21] Appl. No.: 875,686

[22] Filed: Apr. 28, 1992

[30] Foreign Application Priority Data

Apr. 30, 1991 [JP] Japan .................. 3-126919

[51] Int. Cl.$^5$ ............ G03B 7/08; G03B 9/08
[52] U.S. Cl. .................. 354/439; 354/400
[58] Field of Search ............ 354/400, 435, 439, 230, 354/234.1

[56] References Cited

U.S. PATENT DOCUMENTS

| | | | |
|---|---|---|---|
| 4,494,846 | 1/1985 | Kurosu et al. | 354/435 X |
| 4,881,096 | 11/1989 | Ogihara et al. | 354/439 X |
| 4,985,724 | 1/1991 | Akimoto et al. | 354/400 |
| 5,111,230 | 5/1992 | Kobayashi | 354/439 X |
| 5,177,523 | 1/1993 | Huang et al. | 354/439 X |

*Primary Examiner*—Michael L. Gellner
*Assistant Examiner*—Jae N. Noh
*Attorney, Agent, or Firm*—Wenderoth, Lind & Ponack

[57] ABSTRACT

A program shutter adapted to close shutter blades having the function of diaphragm blades by a cam member operated with an electric motor has improved control accuracy in high brightness. A blade opening and closing member for opening and closing the shutter blades is urged to open the blades and driven to close the blades by the cam member operated by the motor. Brightness of an object to be photographed is measured by a brightness measuring portion and an area of a plurality of areas of brightness in which the measured brightness is contained is decided by a brightness decision portion. An exposure control circuit starts measurement of the exposure time when the shutter blades are operated to a predetermined trigger point. The cam member is previously moved to the limitation that movement of a blade driving member is not prevented in accordance with the brightness area in which the current brightness is contained before the exposure control circuit generates the exposure end signal. Thus, a closing delay time at time that the blade opening and closing member is moved to close the shutter by the cam member in response to the exposure end signal is shortened. Consequently, the trigger point for starting the exposure control circuit can be established in a position in which moving operation of the shutter blades just before the shutter blades form a pin hole is stable and exposure accuracy is improved.

7 Claims, 10 Drawing Sheets

CONTROL UNIT FOR A PROGRAM SHUTTER

BACKGROUND OF THE INVENTION

The present invention relates to an improvement of a program shutter including shutter blades having the function of diaphragm blades which are driven to be closed by a cam member operated by an electric motor.

Heretofore, a program shutter including a single blade member having a diaphragm function and a shutter function was adopted in many small cameras. Particularly, the present invention assumes a mechanism in which the blade member is driven to be closed by a cam member operated by an electric motor such as a stepping motor. When the single blade member has the diaphragm function and the shutter function, the blade member is required to control both aperture value and an exposure time.

In order that the blade member attains the diaphragm function, generally, there is adopted a method of restricting the movement limit of a blade opening and closing member, which is coupled with the blade member and urged to open the blade member.

Further, in order that the same blade member attains the shutter function, there is adopted a method in which an exposure controlling timer is started from the time that a blade position detecting means such as, for example, a photo-interrupter, detects that the released blade member has been moved just before a position in which a pin hole is formed, and the blade member is driven to be returned to its initial position in response to the completion of the timer.

Accordingly, with the mechanism adapted to close the blade member with the cam member operated by the stepping motor, when the timer for the exposure control is up after the blade member has been opened by releasing the blade opening and closing member, the cam member driven by the stepping motor is moved on the moving line of the blade opening and closing member to restrict the movement limit of the blade opening and closing member, and the cam member is further moved to return the blade member to its initial position.

However, in the above-described hitherto known control system, there occurs a problem that a time lag, until the cam member actually restricts the movement of the blade driving member after the cam member has started its movement, varies in accordance with a desired aperture value.

More particularly, since the moving range of the blade driving member is large in order to increase the aperture when the brightness of an object to be photographed is low, the time lag until the cam member comes into contact with the blade driving member after the cam member has started its movement is relatively small, whereas since the moving range of the blade driving member is small in order to make the aperture small when the brightness of the object to be photographed is high, the time lag until the cam member comes into contact with the blade driving member after the cam member has started its movement is relatively large, and accordingly the exposure is too great.

In order to heretofore solve this problem, a method was adopted in which a detection means such as a photo-interrupter for starting the timer was disposed near the initial position, as compared with a position where the shutter blade actually forms the pin hole, so that a start timing of the timer is advanced.

In this method, however, since the timer is started in an area in which the movement of the blade member is not stable, immediately after the blade member has started its movement, there is a problem that a time difference until the blade member actually forms the pin hole after the timer has been started tends to be increased, and hence exposure error is apt to occur. Particularly, there is a problem that the exposure error is apt to be large when the brightness is increased, since the absolute value of the exposure time is short.

SUMMARY OF THE INVENTION

The present invention has been made in view of the above problems, and an object of the present invention is to provide a control unit for a program shutter adapted to reduce deterioration of the exposure accuracy when the brightness is increased.

In brief, in the present invention, the brightness of an object to be photographed is divided into a plurality of brightness areas, and a cam member for closing a blade member is previously advanced in accordance with the increased brightness, so that a time lag until the cam member closes the blade member after the cam member has started its movement on the basis of an exposure end signal is prevented from being relatively increased in a high brightness area.

A blade opening and closing member for opening and closing shutter blades having the function of diaphragm blades is urged to open the shutter blades by means of an energizing means. Energizing force produced from the energizing means is transmitted through the blade opening and closing member to the shutter blades, which are moved in the opening direction. Further, the blade opening and closing member is driven to close the shutter blades by the cam member, driven by an electric motor, and the shutter blades are then moved to be closed by the driving force produced by the motor.

On the other hand, the brightness of the object to be photographed is measured by a brightness measuring means. An exposure control means generates the exposure end signal at a timing corresponding to the brightness of the object, counted from the time that a blade position detection means generates a trigger signal at a timing that the shutter blade which is being opened passes through a predetermined point.

The apparatus of the present invention is further characterized by the provision of a brightness deciding means, which decides an area of the plurality of brightness areas of the object bounded by a predetermined or a plurality of brightness of the object into which the brightness of the object indicated by an output of the brightness measuring means falls.

Motor driving means for driving the motor drives the motor so that the cam member is previously moved to close the shutter blades to the extent that the blade opening and closing member is prevented to be operated to a desired open position in accordance with a decision result of the brightness deciding means before the exposure control means generates the exposure end signal and drives the motor to move the cam member toward the closed position of the shutter blades in response to the exposure end signal generated by the exposure control means.

DETAILED DESCRIPTION OF THE PREFERRED EMBODIMENT

Figure 1A:
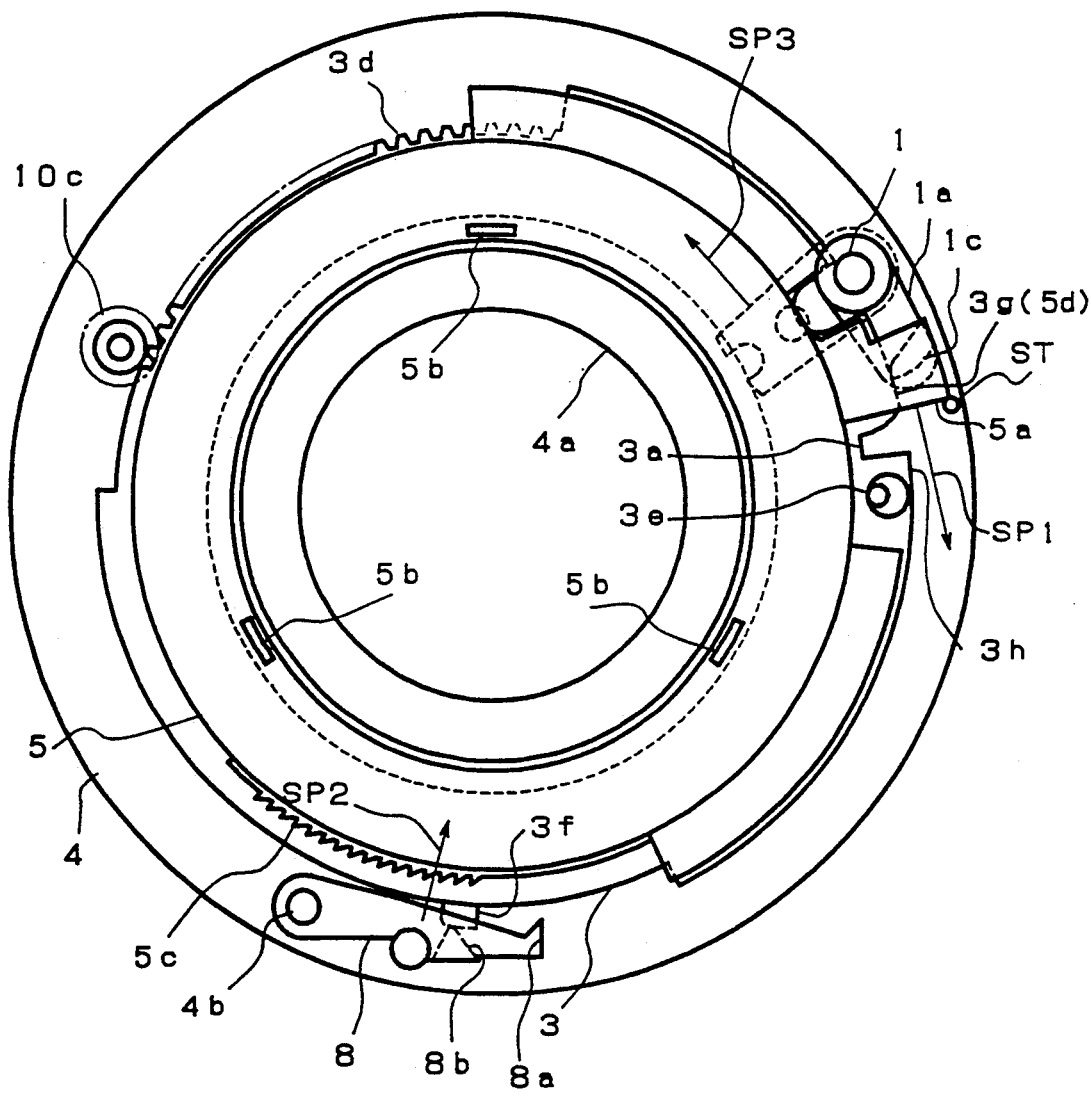
FIGS. 1A and 1B are plan views of members disposed on an upper base plate according to an embodiment of the present invention.

An embodiment of the present invention is now described in detail with reference to the accompanying drawings. FIG. 1A is a plan view showing a cam ring 3, a lens driving ring 5 and a peripheral mechanism thereof disposed on an upper base plate 4 and FIG. 2A is a plan view showing a blade driving ring 7 and a peripheral mechanism disposed on a lower base plate 6.

Figure 3:
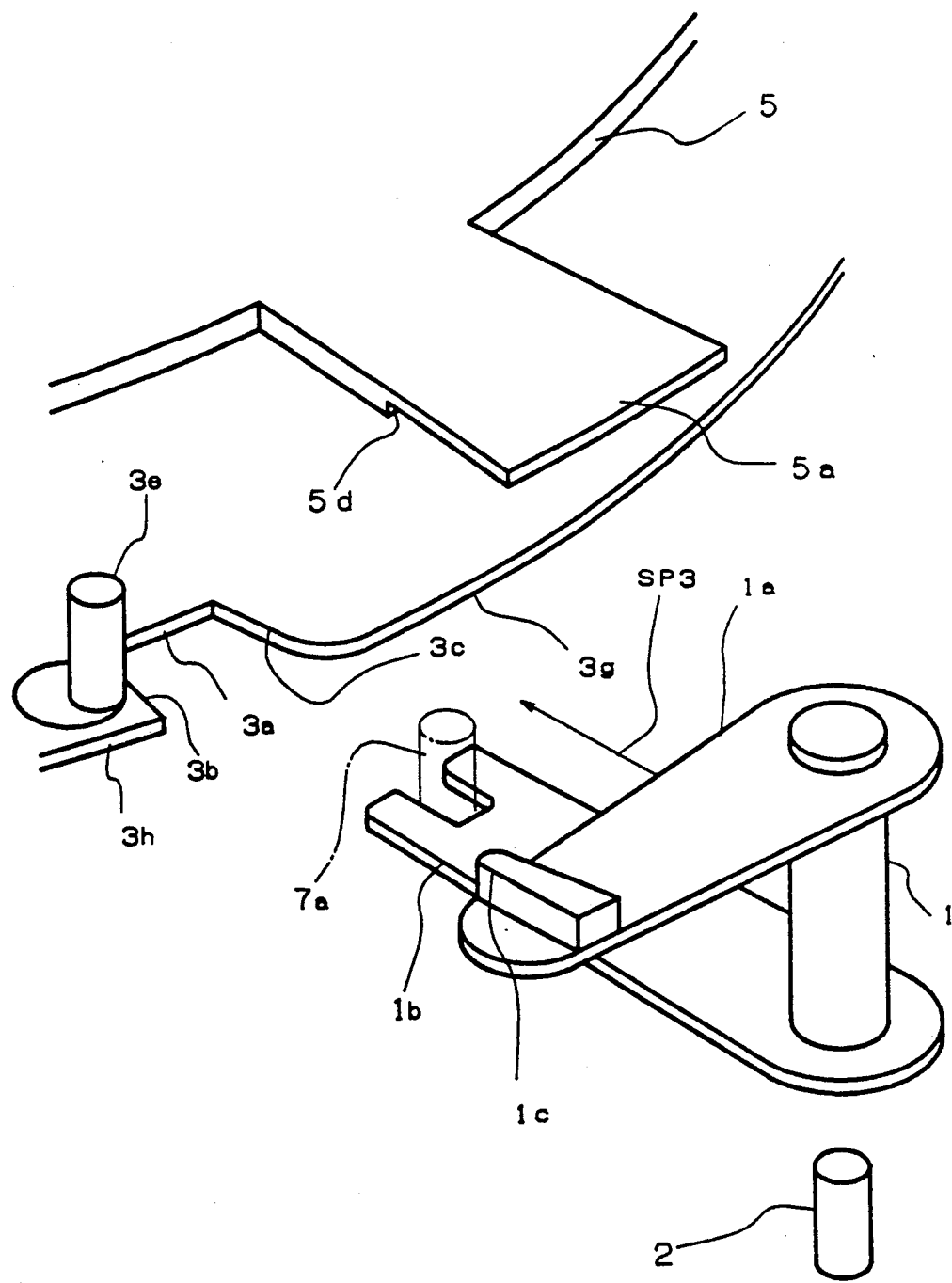
FIG. 3 is a perspective view of a blade opening and closing lever and members disposed around the lever according to an embodiment of the present invention.
Figure 4:
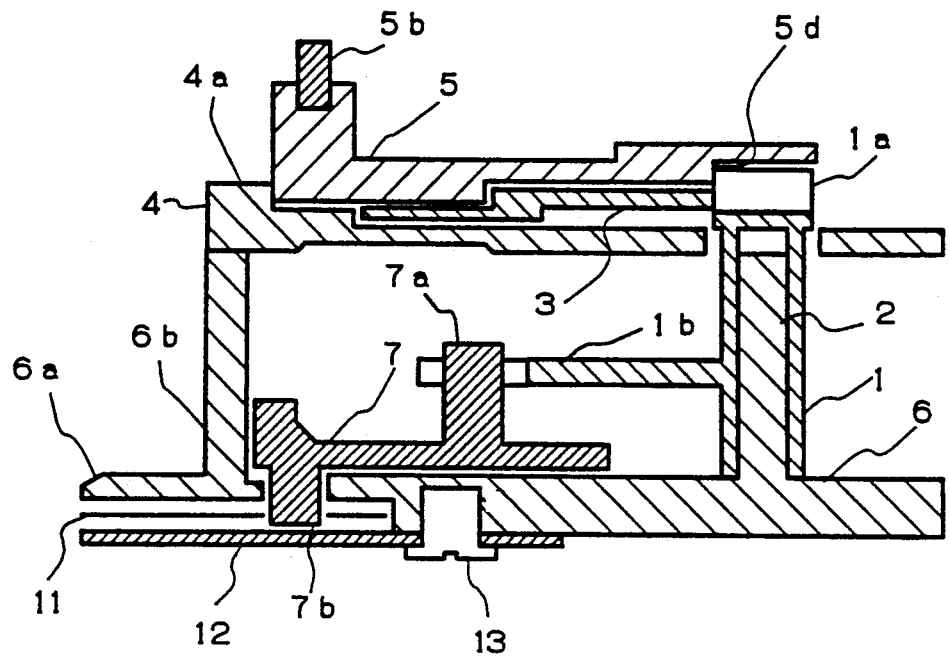
FIG. 4 is a sectional view showing a relation of the blade opening and closing lever, a cam ring and a lens driving ring and a relation of the blade opening and closing lever and a blade driving lever.
Figure 5:
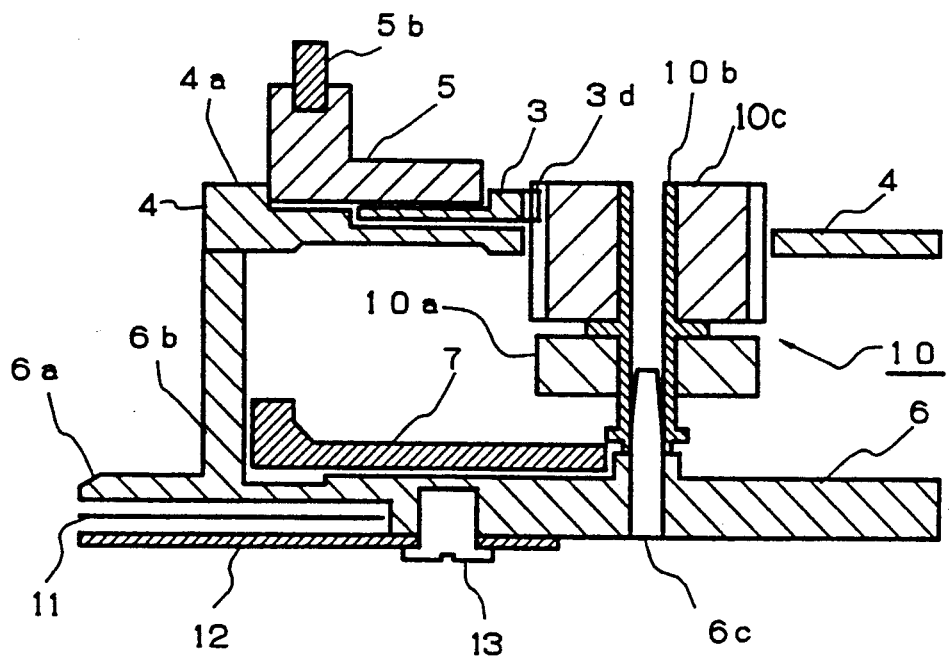
FIG. 5 is a sectional view showing a relation of an electric motor, the cam ring and the lens driving ring.
Figure 6:
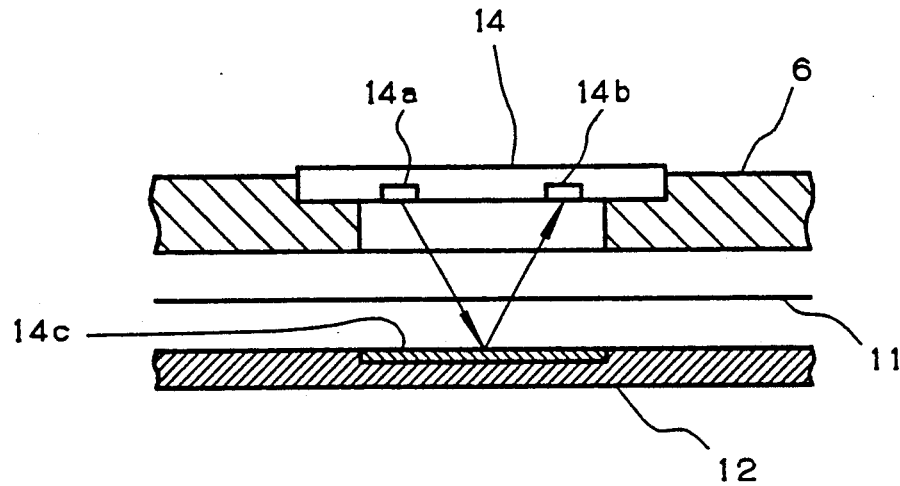
FIG. 6 is a sectional view showing a peripheral mechanism of a photo-reflector.

FIG. 3 is a perspective view showing a blade opening and closing lever 1a and members disposed around the lever, and FIGS. 4 to 6 are sectional views of mechanisms of the present invention. In these sectional views, FIGS. 3 and 4 show the relation between of a cam follower 1c formed on the lever 1a, the cam ring 3 and the lens driving ring 5 and the relation between a holding arm 1b and a blade driving ring 7. FIG. 5 shows the relation between an electric motor 10, the cam ring 3 and the lens driving ring 5, and FIG. 6 shows a peripheral mechanism of a photo-reflector 14. The sectional views show the vertical positional relation of the mechanical members but do not necessarily show the horizontal positional relation thereof.

Figure 2A:
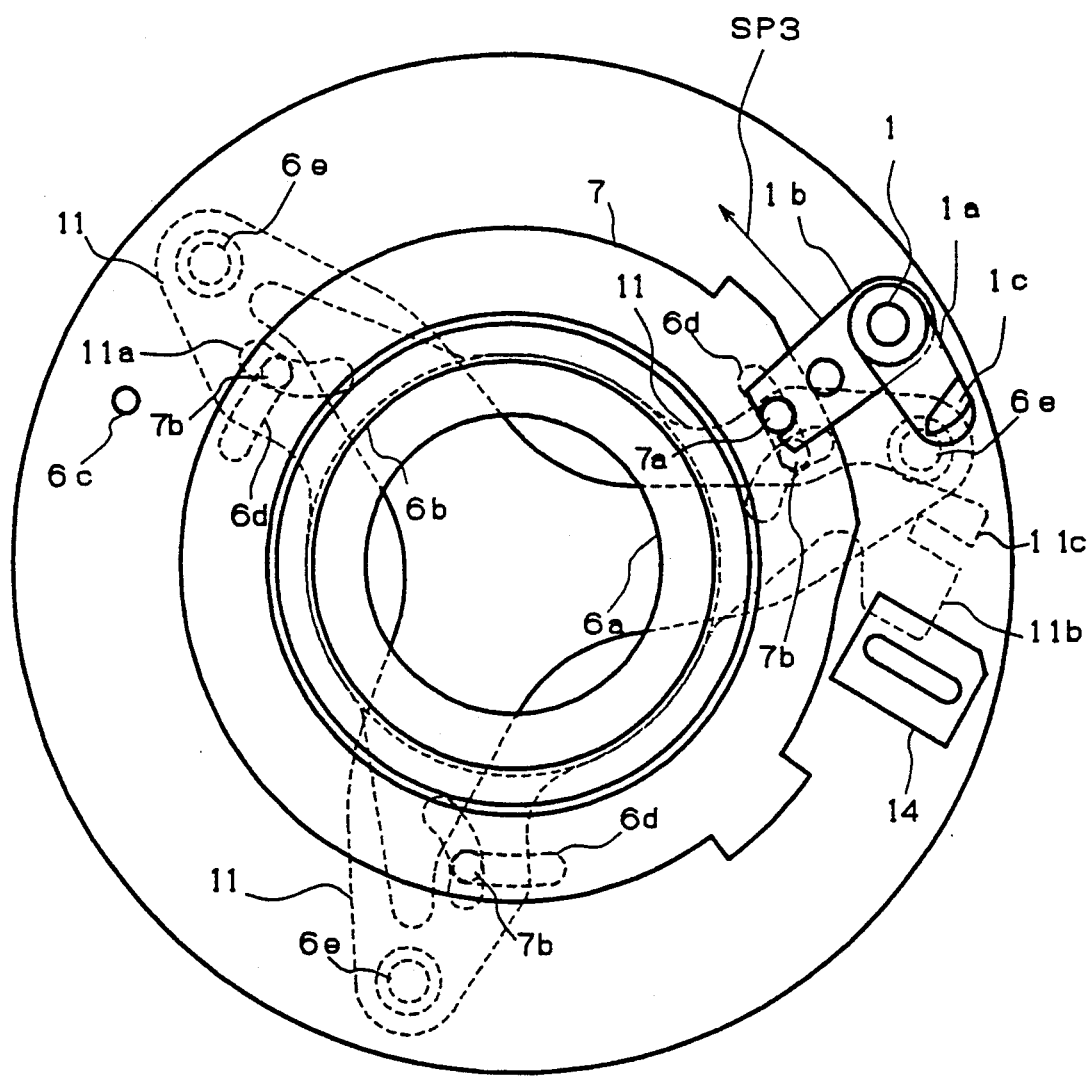
FIGS. 2A and 2B are a plan views of members disposed on a lower base plate according to an embodiment of the present invention.

As shown in FIG. 2A, a circular aperture 6a is formed in the middle portion of the lower base plate 6, formed into a substantially circular shape. A cylindrical member 6b, into which a lens system (not shown) is inserted, is formed around the aperture 6a. The blade driving ring 7 is pivotally supported around the cylindrical member 6b.

The ring-shaped upper base plate 4 shown in FIG. 1A is fixedly mounted to an end of the cylindrical member 6b, and a ring 4a is formed in the middle portion of the upper base plate 6 as shown in the sectional views of FIGS. 4 and 5. The lens driving ring 5 and the cam ring 3 are pivotally supported around the ring 4a.

As shown in FIGS. 2A and 5, a pin 6c is fixedly mounted in the lower base plate 6 and a rotating shaft 10b of the motor 10 is rotatably supported on the pin 6c. A rotor 10a of the motor 10 is fixedly mounted to the rotating shaft 10b and the rotating shaft 10b is rotated stepwise by stepwise changing the magnetic field applied to the rotor 10a from a stator (not shown). Further, a pinion 10c fixedly mounted to the top of the rotating shaft 10b is meshed with a rack 3d formed in the cam ring 3 through the upper base plate 4. Thus, when the pinion 10c is rotated, the cam ring 3 is also rotated around the ring 4a. In the embodiment, for simplification of the drawings and the description, the output pinion 10c of the motor 10 is directly meshed with the rack 3d. However, a transmitting gear train may be interposed therebetween.

As shown in FIGS. 1A and 3, an eccentric pin 3e is mounted in the cam ring 3. An engaging projection 5a is formed on an external edge of the lens driving ring 5 in a counter-clockwise path of the eccentric pin 3e. Accordingly, when the cam ring 3 is rotated counter-clockwise from the initial state shown in FIG. 1A, the lens driving ring 5 is rotated counter-clockwise, while following the cam ring 3, from the time that the eccentric pin 3e comes into contact with the engaging projection 5a.

Three projections 5b for moving out a photographing lens (not shown) are formed on the side of the lens driving ring 5 at intervals of 120 degrees. The lens driving ring 5 is related to the photographing lens so that the photographing lens is moved out toward the object to be photographed when the lens driving ring 5 is rotated counter-clockwise. See FIG. 1B.

Further, the lens driving ring 5 is urged to be moved clockwise by a spring SP1, while in the initial state thereof the engaging projection 5a is in contact with a stopper member ST, so that the clockwise rotation of the lens driving ring 5 is restricted. To prevent complicated drawings, springs are only depicted by arrows indicative of the energizing direction.

As shown in FIG. 1A, a ratchet gear 5c having teeth of a number corresponding to the number of lens setting steps is formed as part of the external edge of the lens driving ring 5. A ratchet lever 8 is swingably supported on an axis 4b mounted on the upper base plate 4. The ratchet lever 8 is urged to be moved counter-clockwise by a spring 2, and a ain1 8a formed at the top of the ratchet lever 8 is engaged with any tooth of the ratchet gear 5c, and thereby the lens driving ring 5 is positioned, as in FIG. 1B. However, in the initial state, a return cam 8b formed on the rear surface of the ratchet lever 8 is pushed up by a projection 3f formed on the cam ring 3, as in FIG. 1A.

As shown in the plan view of FIG. 2A, the perspective view of FIG. 3 and the sectional view of FIG. 4, a coupling pole 1 is rotatably supported on a shaft 2 mounted to the lower base plate 6. The blade opening and closing lever 1a which is, cam-coupled with the cam ring 3, and the holding arm 1b, having an end which is formed into a fork are fixedly mounted to both ends of the coupling pole 1, and thus the blade opening and closing lever 1a and the holding arm 1b are integrally rotated about the coupling pole 1. The blade opening and closing lever 1a and the holding arm 1b are urged to be moved clockwise by a spring SP3, in the initial state shown in FIG. 1A the cam follower 1c is in contact with a step 5d formed on the rear surface of the engaging projection 5a, so that the clockwise rotation of the blade opening and closing lever 1a and the holding arm is restricted.

On the other hand, as shown in FIG. 2A, a pin 7a is fixedly mounted on the front side of the blade driving ring 7, which is pivotally supported around the cylindrical member 6b of the lower base plate 6, and the pin 7a is engaged with the holding arm 1b. Accordingly, when the holding arm 1b is rotated around the axis 2 integrally with the coupling pole 1, the blade driving ring 7 is rotated about the cylindrical member 6b.

Assuming that the shutter blades include three blades, as shown in FIG. 2A, blade engaging pins 7b are mounted on the rear surface of the blade driving ring 7 at intervals of 120 degrees, and each of the blade engaging pins 7b penetrates an arcuate slot 6d formed in the lower base plate 6. Accordingly, the rotation range of the blade driving ring 7 is restricted by the arcuate slot 6d.

Further, as shown in FIG. 2A, shafts 6e are formed in the rear surface of the lower base plate 6 at intervals of 120 degrees, and a shutter blade 11 having the function of the diaphragm blade is swingably supported to on each of the shafts 6e.

Figure 2B:
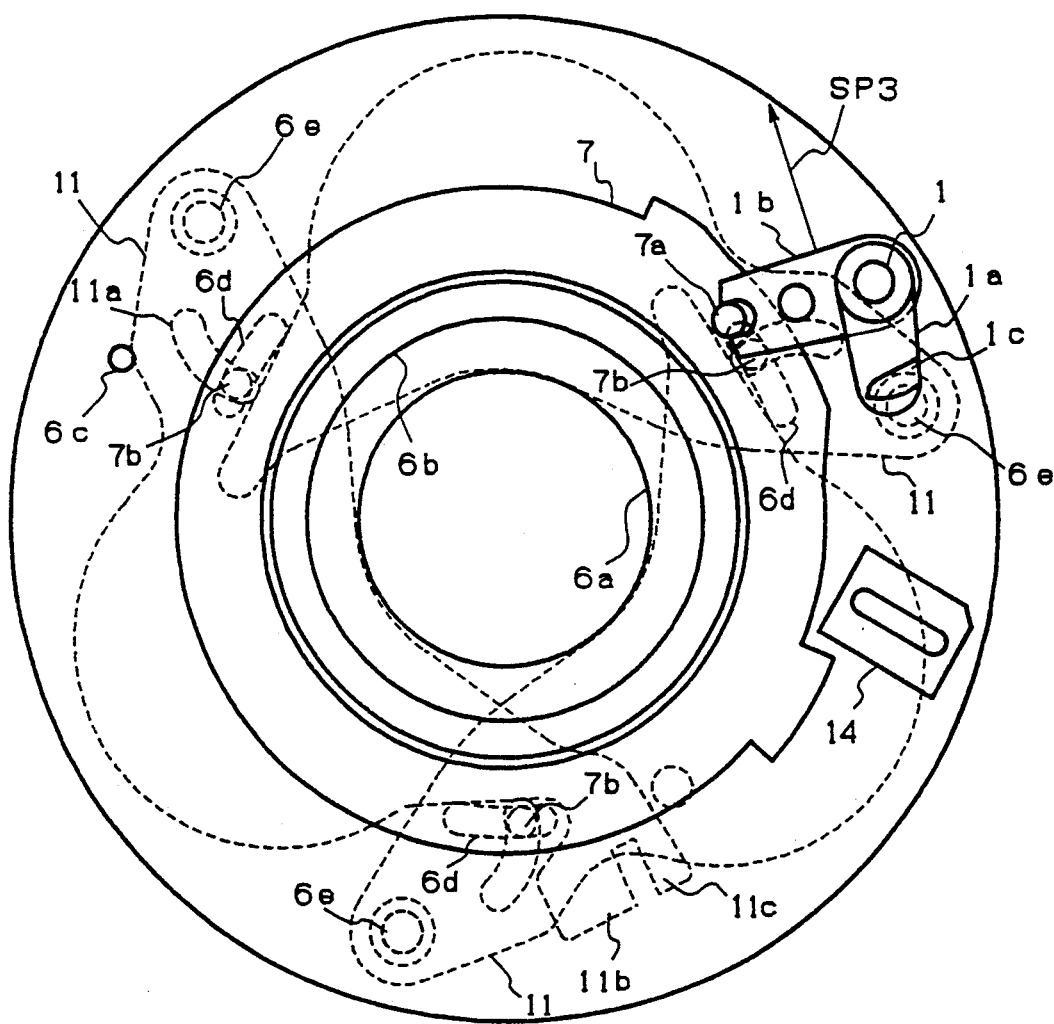

A slot 11a is formed in the shutter blade 11, and the blade engaging pin 7b is engaged with the slot 11a. Accordingly, when the blade driving ring 7 is rotated counter-clockwise from the initial position shown in FIG. 2A, the shutter blades 11 are rotated about the shafts 6e clockwise to open the exposure aperture 6a, as shown in FIG. 2B. In FIGS. 4 and 5, numeral 12 denotes a blade holding plate for preventing vibration of the shutter blade 1. The blade holding plate 12 is fixed on the rear surface of the lower base plate 6 by means of a machine screw 13.

As described above, the holding arm 1b is rotated integrally with the blade opening and closing lever 1a, and the rotation of the blade opening and closing lever 1a is controlled by the cam edge formed in the cam ring 3.

More particularly, as shown in the perspective view of FIG. 3, the cam ring 3 is formed with a series of cam edges 3h, 3b, 3a, 3c and 3g. On the other hand, the blade opening and closing lever 1a is urged to be moved clockwise by a spring SP3. Accordingly, when the cam ring 3 is rotated clockwise from the state where the cam follower 1c formed on the blade opening and closing lever 1a is in contact with the cam edge 3h, so that the cam follower 1c is moved from the cam edge 3h along the cam edge 3b and falls into the cam edge 3a, the blade opening and closing lever 1a is rotated clockwise together with the holding arm 1b. Thus, the holding arm 1b rotates the blade driving ring 7 counter-clockwise to open the shutter blades 11.

When the cam ring 3 is further rotated clockwise from the above state, the cam edge 3c pushes up the cam follower 1c and the cam follower 1c rides on the cam edge 3g. The blade opening and closing lever 1a is then rotated counter-clockwise together with the holding arm 1b. Thus, the holding arm 1b rotates the blade driving ring 7 clockwise to close the shutter blades 11.

Numeral 14 denotes a photo-reflector for detecting a position of the shutter blade 11, and detection plates 11b and 11c detected by the photo-reflector 14, are formed on an end of a shutter blade 11.

FIG. 6 shows the photo-reflector 14 and its vicinity. The photo-reflector 14 includes a light emitting portion 14a and a light receiving portion 14b, which are mounted to the lower base plate 6 to face the blade holding plate 12. On the other hand, a reflector 14c for reflecting light emitted from the light emitting portion 14a toward the light receiving portion 14b is formed in the blade holding plate 12, and a light path from the light emitting portion 14a to the light receiving portion 14b is opened and closed by the shutter blade 11. In the embodiment, the position of the photo-reflector is decided so that the detection plate 11b passes through the light path of the photo-reflector 14 just before the shutter blade 11 forms a pin hole.

Figure 7:
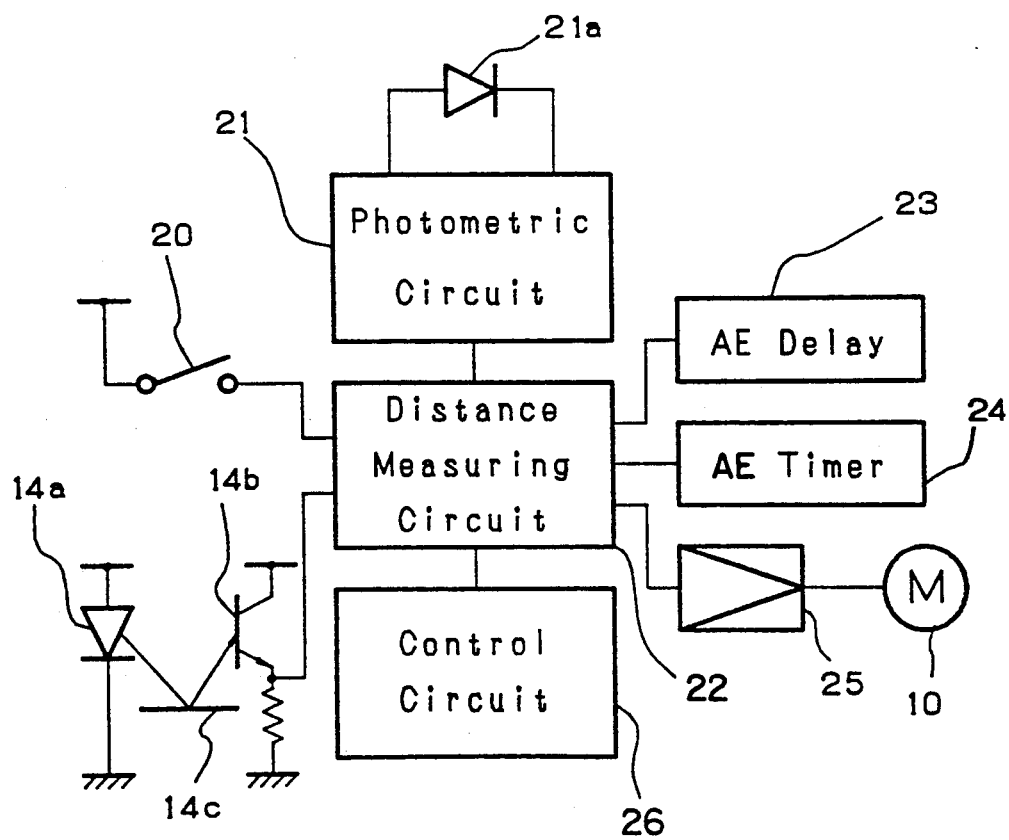
FIG. 7 is a block diagram of a control system of the present invention.

FIG. 7 is a block diagram of a control system of the present invention. In FIG. 7, numerals 14a, 14b and 14c denote the light emitting portion 14a, the light receiving portion 14b and the reflector 14c constituting the photo-reflector 14, respectively. Numeral 20 denotes a known release switch, 21 a photometric circuit having a light receiving element 21a, 22 a known distance measuring circuit, 23 an AE delay timer, 24 an AE timer, 25 the driver for driving the stepping motor 10, and 26 a control circuit for controlling the whole system.

The control circuit 26 controls a precedent movement of the cam ring 3 in accordance with the brightness of the object to be photographed after the cam follower 1c is moved from the cam edge 3h along the cam edge 3b and falls into the cam edge 3a in response to the clockwise rotation of the cam ring 3, to thereby stabilize the delay time until the cam edge 3c reaches the cam follower 1c actually after generation of the exposure end signal, regardless of the brightness of the object.

Operation of the embodiment is now described with reference to the foregoing description, a flow chart in FIG. 8, timing charts in FIGS. 9 and 10 and a partially enlarged diagram in FIG. 11.

Figure 9:
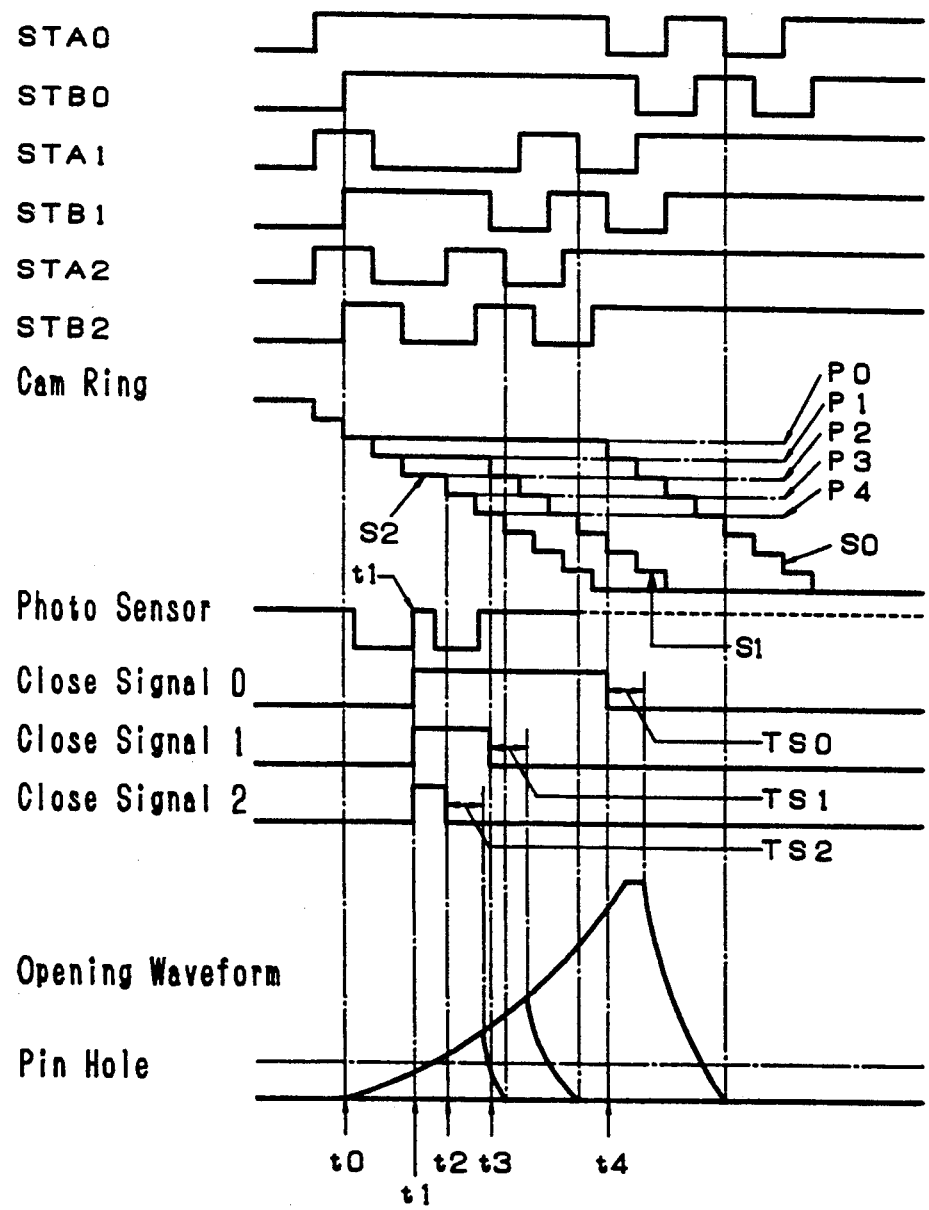
FIG. 9 is a timing chart showing a control timing of the present invention.

It is assumed that in the timing chart of FIG. 9 the stepping motor 10 is of two-phase excitation having A and B phases. STA0 represents an A phase pulse in a mode 0 (selected in low brightness) and STB0 represents a B phase in the mode 0. A falling edge of a close signal 0 represents a 'time up' timing of the AE timer 24 in the mode 0.

Similarly, STA1 represent an A phase pulse in a mode 1 (selected in medium brightness) and STB1 represents a B phase pulse in the mode 1. A falling edge of a close signal 1 represents a 'time up' timing of the AE timer 24 in the mode 1.

Similarly, STA2 represents an A phase pulse in a mode 2 (selected in high brightness) and STB2 represents a B phase pulse in the mode 2. A falling edge of a close signal 2 represents a time up timing of the AE timer 24 in the mode 2.

In the initial state, the whole mechanism is in the state shown in FIGS. 1A and 2A. In this state, when the release switch 20 is closed, the control circuit 26 reads distance information from the distance measuring circuit 22 and brightness information of the object to be photographed from the photometric circuit 21 and selects a photographing mode in accordance with the brightness information of the object.

For example, the control circuit 26 selects the mode 2 for a high brightness area having an Ev value of 14 or more, a mode 1 for the medium brightness area having the Ev value of 12.5 to 14, and the mode 0 for a low brightness area having the Ev value of 12.5 or less.

Thereafter, the control circuit 26 supplies a normal rotation pulse to the stepping motor 10 through the driver 25 to rotate the stepping motor 10 clockwise. The rotation of the stepping motor 10 is transmitted to the cam ring 3 through the output pinion 10 to the rack 3d, and the cam ring 3 is pivotally rotated counter-clockwise in FIG. 1. In the course of the pivotal rotation of the cam ring 3, the lens driving ring 5 is rotated counter-clockwise to follow the cam ring 3 from the time that the eccentric pin 3e mounted on the cam ring 3 is engaged with the engaging projection 5a of the lens driving ring 5.

While the cam ring 3 is rotated counter-clockwise from the initial position, the cam edge 3a passes by the cam follower 1c of the blade opening and closing lever 1. However, at the time that the cam edge 3a is passing by the cam follower 1c, the cam follower 1c abuts against the step 5d on the rear surface of the engaging projection 5a of the lens driving ring 5. Further, since the cam edge 3h of the cam ring 3 reaches the position of the cam follower 1c before the cam follower 1c is released from the step 5d, the blade opening and closing lever 1a is not rotated clockwise when the cam edge 3a passes by the cam follower 1c in response to the counter-clockwise rotation of the cam ring 3 from the initial position.

When the lens driving ring 5 is rotated counter-clockwise, the projections formed on the lens driving ring 5 move out the photographing lens (not shown.) When the stepping motor 10 is rotated by the step number corresponding to the distance information given from the distance measuring circuit 22, the control circuit supplies a reverse rotation pulse to the stepping motor 10 through the driver 25 to reversely rotate the stepping motor 10. Usually there is a waiting time for stabilizing the state of the motor upon switching from the normal rotation to the reverse rotation.

Figure 1B:
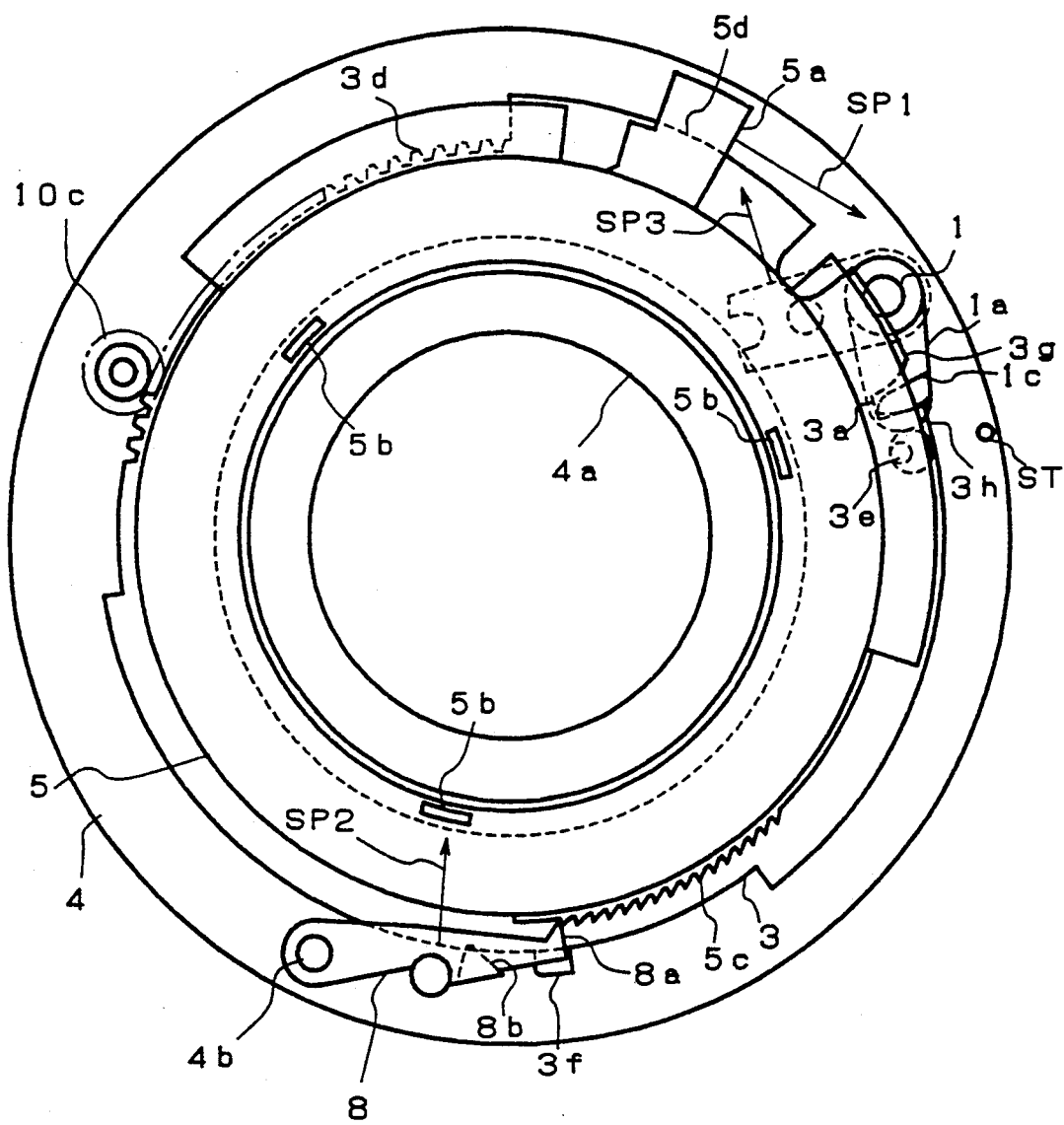

When the stepping motor 10 is reversely rotated, the cam ring 3 is rotated clockwise at this time the return cam 8b of the ratchet lever 8 has been released from the projection 3f of the cam ring 3 and accordingly the ratchet lever 8 has been rotated counter-clockwise by the force of the spring SP2, as in FIG. 1b.

Accordingly, since the pawl of the ratchet lever 8 is engaged with any tooth of the ratchet gear 5c, only the cam ring 3 is rotated clockwise when the stepping motor is reversely rotated.

After the stepping motor 10 is reversely rotated by the step number corresponding to the number of the lens setting steps and the stabilizing time elapses, the control circuit 26 further rotates the stepping motor 10 by two steps.

The timing of the stepping motor 10 being reversely rotated toward the initial position by two steps, with respect to the number of the lens setting steps as described above, corresponds to time t0 of FIG. 9.

Figure 11:
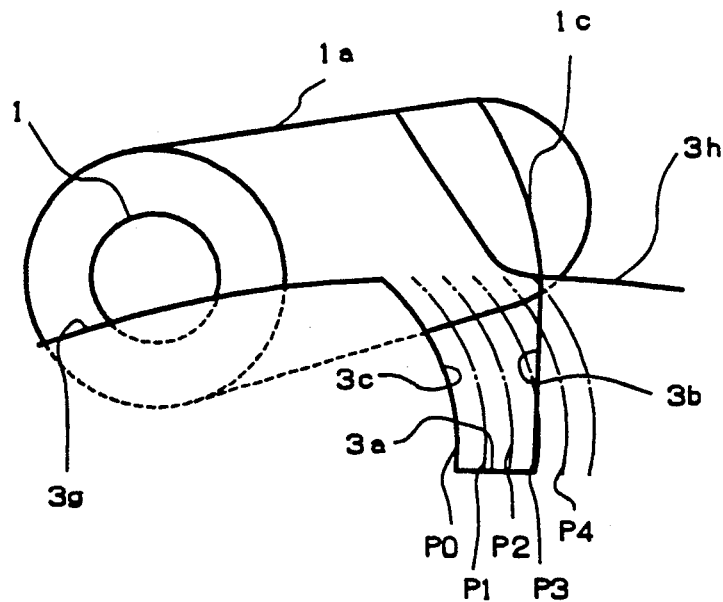
FIG. 11 is an enlarged view showing an operation principle of the blade opening and closing lever according to the embodiment of the present invention.

At time t0, the cam ring 3 is positioned at position P0 of the timing chart and the cam edge 3c of the cam ring 3 is positioned at position P0 of FIG. 11. Accordingly, at time t0, the cam follower 1c of the blade opening and closing lever 1a is moved from the cam edge 3h of the cam ring 3 along the cam edge 3b and falls into the cam edge 3a, and the blade opening and closing lever 1a is rotated clockwise about the axis 2 by the force of the spring SP3.

Thus, the holding arm 1b is rotated clockwise while holding the pin 7a of the blade driving ring 7, and the blade driving ring 7 is rotated counter-clockwise about the cylindrical member 6b. Accordingly, the shutter blades 11 are rotated clockwise about the shafts 6a by the slot 11a being engaged with the blade engaging pin 7b formed in the rear surface of the blade driving ring 7, so that the exposure aperture 6a is opened.

The foregoing operation is common to all of the modes, from the mode 2 for high brightness to the mode 0 for low brightness. The subsequent operation for mode 2 for the high brightness, the mode 1 for medium brightness 1 and the mode 0 for low brightness is now described sequentially.

The mode 2 for high brightness is now described.

Figure 8:
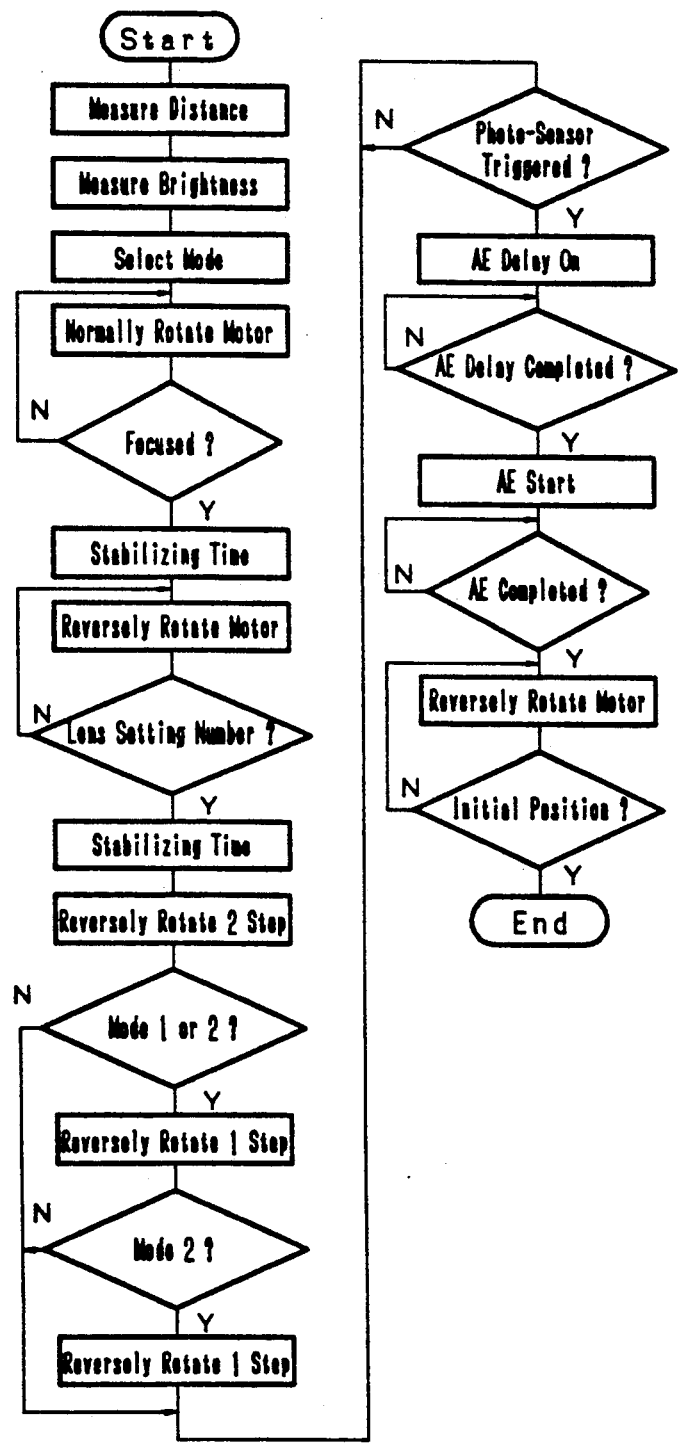
FIG. 8 is a flow chart showing an control operation of the present invention.

As shown in the flow chart of FIG. 8, in the mode 2 for high brightness, the control circuit 26 reversely rotates the stepping motor 10 a further two steps after the time t0, and waits until the AE timer 24 is up. Accordingly, the cam ring 3 reaches a position P2 in FIG. 9 and the cam edge 3c reaches a position P2 of in FIG. 11. It is needless to say that the position P2 is a position in which a necessary rotation of the blade opening and closing lever 1a in the high brightness can be secured even if the cam edge 3c is precedently moved to this position.

On the other hand, when the shutter blades 11 are rotated clockwise, the detection plates 11b and 11c pass through the photo-reflector 14 sequentially and the light path from the light emitting portion 14a to the light receiving path 14b is opened and closed. At time t1 of FIG. 9, just before the shutter blades 11 form a pin hole, the detection plate 11b opens the light path from the light emitting portion 14a to the light receiving portion 14b, and the output of the photo-reflector 14 rises.

The control circuit 26 starts the AE delay timer 23 in response to the rising edge of the output of the photo-reflector 14. When the set time of the AE delay timer 23 elapses, the control circuit 26 starts the AE timer 24 and the AE timer is up at the timing corresponding to the brightness of the object.

In the timing chart of FIG. 9, a sum of the time of the AE delay timer 23 and the time of the AE timer 24 is represented as the close signal.

For example, when the AE timer 24 is up at time t2 of FIG. 9, the control unit 26 reversely rotates the stepping motor 10 toward the initial position, and the rotation of the stepping motor 10 is transmitted so that the cam ring 3 is rotated clockwise along a stepwise operation line S2 from the position P2 of FIG. 9. Thus, when the cam edge 3c of the cam ring 3 comes into contact with the cam follower 1c of the blade opening and closing lever 1a, the clockwise rotation of the blade opening and closing lever 1a is stopped to restrict the aperture value. When the cam ring 3 is subsequently rotated clockwise, the cam edge 3c pushes up the cam follower 1c and the blade opening and closing lever 1a is rotated counter-clockwise. Accordingly, the holding arm 1b rotates the blade driving ring 7 clockwise and the shutter blades 11 are rotated counter-clockwise about the shafts 6e so that the shutter blades 11 pass through the pin hole position of the position P3 and the closed position of the position P4 to be returned to the initial position and the exposure aperture 6a is completely closed.

In the mode 2 for high brightness, the cam edge 3c of the cam ring 3 is reversely rotated precedently to the position P2 of FIG. 11 (corresponding to the position P2 of FIG. 9) at time t2 that the AE timer 24 is up and accordingly at the beginning of the reverse rotation from the position P2 the cam edge 3c merely produces a slight delay time TS2 due to the force of inertia of members or the like and comes into contact with the cam follower 1c, so that the closing delay time can be shortened.

The mode 1 for medium brightness is now described.

As shown in the flow chart of FIG. 8, in the mode 1 for medium brightness, the control circuit 26 reversely rotates the stepping motor 10 by one step further after the time t0, and waits until the AE timer 24 is up. Thus, the cam ring 3 reaches the position P1 of FIG. 9 and the cam edge 3c reaches the position P1 of FIG. 11. It is needless to say that the position P1 is a position where a necessary rotation of the blade opening and closing lever 1a in medium brightness can be secured even if the cam edge 3c is precedently moved to this position.

Accordingly, when the AE timer 24 is up at the time t3 of FIG. 9, since the cam edge 3c of the cam ring 3 is reversely rotated precedently to the position P1 of FIG. 11 (corresponding to the position P1 of FIG. 9) in the time t3, the cam edge 3c merely produces a slight delay time TS1 due to the force of inertia of the members or the like in the beginning of the reverse rotation along the stepwise operation line S1 from the position P1, and comes into contact with the cam follower 1c, so that the closing delay time can be shortened.

As shown in FIG. 8, in the mode 0 for low brightness, the control circuit 26 stops the stepping motor 10 at the position of the time t0 and waits until the AE timer 24 is up. Thus, the cam edge 3c waits at the position P0 of FIG. 11.

Accordingly, when the AE timer 24 is up at time t4 of FIG. 9, since the cam edge 3c of the cam ring 3 stops at the position P0 of FIG. 11 (corresponding to the position P0 of FIG. 9) at the time t4, the cam edge 3c merely produces a slight delay time TS0 due to the force of inertial of the members or the like in the beginning of the reverse rotation along the stepwise operation line S0 from the position P0 and comes into contact with the cam follower 1c, so that the closing delay time can be shortened.

In this manner, according to the present invention, since the cam ring 3 previously was returned to the limit position in which the blade opening and closing lever 1a is prevented from being operated to a desired aperture position in the cases of large, medium and small diaphragms, a time lag until the shutter blades 11 actually start the closing operation thereof after the AE timer 24 has generated the exposure end signal can be reduced greatly.

Thus, according to the present invention, the trigger point for the automatic exposure control can be provided near the pin hole position, as compared with the conventional mechanism of the same type, and since the moving characteristic of the blades is stable in the pin hole position, the accuracy of the exposure control can be improved.

In the embodiment, when the mode 0 for low brightness is set to a reference, since the closing operation is made from the position P1 in which the cam ring 3 is returned to the original point side by one step for the medium brightness mode 1, and from the position P2 in which the cam ring 3 is returned to the original point side by two steps for the high brightness mode 2, the time table for the AE control set in the AE timer 24 is required to be shifted in accordance with a difference of the closing driving position for each mode.

Figure 10:
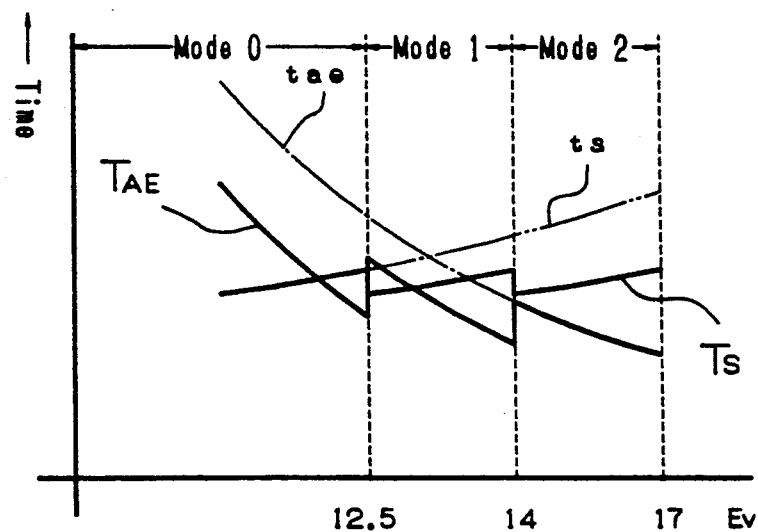
FIG. 10 is a time chart showing a time table established in an AE timer according to an embodiment of the present invention.

FIG. 10 shows a relation of a setting time TAE of the AE timer 24 and a delay time solid lines represent an example of the present invention, chain lines represent an example in the prior art.

In the conventional control system of the shutter of this type, since it is necessary to shorten the exposure time in accordance with increased brightness of the object, the setting time of the AE timer 24 is generally set to be reduced with the increased brightness of the object, as shown by the curve tae by a one-dot-chain line. However, in the conventional control system, since the cam ring 3 is returned from a fixed position regardless of the brightness of the object, the delay time until the cam edge 3c actually comes into contact with the cam follower 1c from generation of the exposure end signal by the AE timer 24 is increased as the brightness of the object is high and the diaphragm is small as shown by curve ts of a two-dot-chain line.

On the other hand, in the control system of the embodiment of the present invention, since the cam ring 3 previously returned to the position in which the cam edge 3c does not impede the opening operation of the blade opening and closing lever 1a with respect to boundaries of Ev values of 12.5 and 14, and the blade opening and closing lever 1a is returned from the position, the delay time until the blades actually start the closing operation after generation of the closing command by the control circuit 26 is greatly reduced over the whole exposure area as shown by solid curve TS. In the embodiment, as described above, since the position in which the cam edge 3c closes the blade opening and closing lever 1a is shifted with respect to the boundaries of the Ev values of 12.5 and 14, the setting time of the AE timer 24 is shifted stepwise with respect to the boundary of this point, as shown by the solid curve TAE.

In the foregoing description, the brightness of the object is divided into three areas, while the number of divided areas can be selected properly in accordance with the required accuracy.

In the foregoing description, the engagement and release and return operation of the blade opening and closing lever 1a are made by the same cam ring. Since it is essential in the present invention that the cam member for closing the blade opening and closing member is previously advanced within the range in which the blade opening and closing member is not prevented to be operated to a desired aperture position, decided in accordance with the brightness of the object, the engagement and release of the blade opening and closing member can be made by another member such as, for example, a magnet release, and the blade opening and closing member can be operated by means other than the spring.

As described above, according to the present invention, since the cam member for closing is previously moved within the range in which the blade opening and closing member is not prevented to be operated for opening to the desired position in accordance with the brightness of the object, the delay time until the closing is actually made, after generation of the exposure end command by the exposure control circuit or the like, can be reduced.

Accordingly, according to the present invention, since it is not necessary to establish the timing for starting the exposure control apparatus in anticipation of a large delay time, the trigger point of the exposure control apparatus can be established in the position in which the moving operation of the shutter blades is stable just before the shutter blades form the pin hole, and hence stable exposure control can be attained.

What is claimed is:

1. A control unit for a program shutter, comprising:
a plurality of shutter blades;
a blade opening and closing member connected with said plurality of shutter blades for opening and closing said shutter blades;
means for urging said blade opening and closing member to open said shutter blades;

an electric motor;

a cam member connected to said electric motor and engaged with said blade opening and closing member for rotation by said electric motor to selectively open and close said shutter blades;

brightness measuring means for measuring the brightness of an object to be photographed and producing an output value corresponding to the brightness;

a shutter blade position detecting means for generating a trigger signal when said shutter blades pass through a predetermined point during an opening operation of said shutter blades;

an exposure control means for generating an exposure end signal when a time corresponding to said output value of said brightness measuring means has elapsed, said time starting when said blade position detecting means generates said trigger signal;

brightness decision means for determining one of a plurality of areas of brightness of the object corresponding to said output value of said brightness measuring means; and motor control means for controlling said electric motor such that when said electric motor rotates said cam member to open said shutter blades, said cam member is moved in the direction of closing of said shutter blades to a predetermined position corresponding to said area brightness determined by said brightness decision means before said exposure control means generates said exposure end signal while still allowing said blade opening and closing member to open said shutter blades to a desired aperture position, and for controlling said electric motor such that said cam member is rotated to close said shutter blades in response to said exposure end signal being generated by said exposure control means.

2. The control unit for a program shutter of claim 1, wherein said brightness decision means determines a said area of brightness for an object to be photographed with respect to predetermined brightness boundaries.

3. The control unit for a program shutter of claim 2, wherein said brightness boundaries separate areas of low, medium and high brightness, and wherein the time corresponding to said output value of said brightness measuring means is correspondingly changed according to said area of brightness that is determined.

4. The control unit for a program shutter of claim 3, wherein said motor comprises a stepping motor.

5. The control unit for a program shutter of claim 1, wherein said motor comprises a stepping motor.

6. The control unit for a program shutter of claim 1, wherein said blade opening and closing member comprises a cam follower engaged with said cam member, and said cam member has a plurality of cam surfaces thereon corresponding to closed and open positions of said shutter blades.

7. The control unit for a program shutter of claim 6, wherein said cam surface corresponding to said open position of said shutter blades has a plurality of predetermined positions thereon corresponding to respective said areas of brightness.

* * * * *